United States Patent
Mallenahally

(10) Patent No.: US 10,095,857 B1
(45) Date of Patent: Oct. 9, 2018

(54) 3D CHALLENGE-RESPONSE TESTS TO DISTINGUISH HUMAN USERS FROM BOTS

(71) Applicant: INTUIT INC., Mountain View, CA (US)

(72) Inventor: Girish Mallenahally, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/495,628

(22) Filed: Apr. 24, 2017

(51) Int. Cl.
```
G06F 21/36      (2013.01)
H04N 1/00       (2006.01)
H04N 5/232      (2006.01)
H04L 29/06      (2006.01)
G06F 3/0488     (2013.01)
```

(52) U.S. Cl.
CPC .......... *G06F 21/36* (2013.01); *G06F 3/04883* (2013.01); *H04L 63/10* (2013.01); *H04N 1/00307* (2013.01); *H04N 5/23296* (2013.01); *G06F 2221/2133* (2013.01)

(58) Field of Classification Search
CPC ................. G06F 21/36; G06F 3/04883; G06F 2221/2133; H04N 1/00307; H04N 5/23296; H04L 63/10
See application file for complete search history.

(56) References Cited

U.S. PATENT DOCUMENTS

| | | | |
|---|---|---|---|
| 8,621,396 B1 | 12/2013 | Gossweiler, III | |
| 8,990,959 B2* | 3/2015 | Zhu | G06T 19/20 345/419 |
| 2008/0216163 A1* | 9/2008 | Pratte | G06F 21/36 726/7 |
| 2009/0313694 A1* | 12/2009 | Mates | G06F 21/36 726/21 |
| 2011/0197268 A1* | 8/2011 | Ravikumar | H04L 9/3271 726/6 |
| 2012/0005483 A1* | 1/2012 | Patvarczki | G06F 21/36 713/182 |

(Continued)

OTHER PUBLICATIONS

Chow, Yang-Wai et al., "AniCAP: An animated 3D CAPTCHA scheme based on motion parallax", Lecture Notes in Computer Science, 2011, 14 pages. (Year: 2011).*

(Continued)

*Primary Examiner* — Michael Pyzocha
(74) *Attorney, Agent, or Firm* — Patterson + Sheridan, LLP

(57) ABSTRACT

The present disclosure provides a challenge-response testing systems for distinguishing between human users and bots. When a user requests to access an electronic resource on a computing device, the computing device identifies a challenge-response test for the user to complete. As part of the test, the computing device renders a first view of a 3D environment on a digital display. The computing device notifies the user of a test condition to complete. To satisfy the test condition, the user has to provide input that will effect a specified change to the view of the 3D environment seen on the display. Once the user provides electronic input, the computing device updates the viewing perspective of the 3D environment and renders an updated view on the digital display. When the user submits an indication that the test has been completed, the computing device verifies whether the test condition has been satisfied.

20 Claims, 6 Drawing Sheets

(56) References Cited

U.S. PATENT DOCUMENTS

| | | | | |
|---|---|---|---|---|
| 2012/0291122 | A1* | 11/2012 | Chow | G06F 21/36 726/19 |
| 2014/0125574 | A1* | 5/2014 | Scavezze | G06F 21/31 345/156 |
| 2014/0150085 | A1* | 5/2014 | Furuichi | G06F 21/36 726/17 |
| 2016/0041641 | A1* | 2/2016 | Xia | G06F 3/0488 345/175 |
| 2016/0162677 | A1* | 6/2016 | Kohlenberg | G06F 21/36 726/19 |
| 2016/0300054 | A1* | 10/2016 | Turgeman | H04L 63/08 |
| 2017/0004293 | A1* | 1/2017 | Mantri | G06F 3/017 |
| 2017/0091983 | A1* | 3/2017 | Sebastian | G10H 1/0008 |
| 2017/0220790 | A1* | 8/2017 | Fonseca | G06F 21/36 726/19 |
| 2017/0262623 | A1* | 9/2017 | Plenderleith | G06F 21/36 |
| 2017/0345218 | A1* | 11/2017 | Bedikian | G09G 5/14 |

OTHER PUBLICATIONS

Woo, Simon et al., "3DOC: 3D Object CAPTCHA", WWW'14 Companion, Apr. 7-11, 2014, Seoul, Korea, pp. 397-398. (Year: 2014).*

Rolko, Juraj, "3D CAPTCHA", 2010, pp. 1-15. (Year: 2010).*

* cited by examiner

3D CHALLENGE-RESPONSE TESTS TO DISTINGUISH HUMAN USERS FROM BOTS

BACKGROUND

Field

Embodiments presented herein generally relate to systems for challenge-response authentication. More specifically, systems are disclosed for distinguishing between human users and non-human users (e.g., bots) using challenge-response authentication.

Related Art

In computer security, challenge-response authentication refers to a family of protocols in which one party presents a challenge (e.g., a question or an affirmative request for a specific action) and a responding party seeking to be authenticated must provide an acceptable response (e.g., a correct answer to a question) to the challenge. A Completely Automated Public Turing test to tell Computers and Humans Apart (CAPTCHA) is one example of a challenge-response test that, as the name indicates, is meant to tell humans and computers apart. One type of CAPTCHA presents a distorted image of text to a user and requires the user to type the text into an input field. A human user can usually read the text in the distorted image with little difficulty, while a computer program (e.g., a bot) will often struggle to identify the text. Another type of CAPTCHA presents several images to a user and requires the user to select the image that depicts a particular item. A human user can typically identify the proper image quickly, while a bot will typically struggle to identify the correct image.

Web sites often use CAPTCHAs to restrict access to certain resources, such as account sign-up services, voting functions, or online applications. By restricting access in this fashion, web sites can prevent bots from overextending server resources, thereby maintaining desired service levels for human visitors. Also, some malicious activities that employ bots, such as denial-of-service attacks, can be thwarted. Furthermore, restricting access via CAPTCHAs can prevent bots from committing other abuses of electronic resources, such as purchasing mass quantities of limited goods (e.g., tickets to sporting events or concerts).

SUMMARY

One embodiment of the present disclosure includes a method for determining whether an entity seeking access to an electronic resource is human. The method generally includes receiving an electronic request from a user to access an electronic resource; identifying, in response to the electronic request, a test for the user to complete in order to gain access to the electronic resource, wherein the test is associated with a digital model of a three-dimensional (3D) environment and a test condition; rendering, on a digital display and based on the digital model, a first view of the 3D environment from a first viewing perspective; sending, in response to the electronic request, a message indicating the test condition to the user; receiving electronic input from the user in response to the message; rendering, on the digital display and based on the digital model, a second view of the 3D environment from a second viewing perspective, wherein the second viewing perspective is based on the electronic input; receiving an electronic submission indication from the user for the test; and determining an access privilege for the electronic resource for the user based on the electronic submission indication, the second viewing perspective, and the test condition.

Another embodiment provides a computer-readable storage medium having instructions, which, when executed on a processor, perform an operation for determining whether an entity seeking access to an electronic resource is human. The operation generally includes receiving an electronic request from a user to access an electronic resource; identifying, in response to the electronic request, a test for the user to complete in order to gain access to the electronic resource, wherein the test is associated with a digital model of a three-dimensional (3D) environment and a test condition; sending, in response to the electronic request, a message indicating the test condition to the user; rendering, on a digital display and based on the digital model, a first view of the 3D environment based on a first pose of a virtual camera; receiving electronic input from the user indicating a pose modification for the virtual camera; determining a second pose of the virtual camera based on the pose modification; rendering, on the digital display and based on the digital model, a second view of the 3D environment based on the second pose of the of the virtual camera; receiving an electronic submission indication from the user for the test; and determining an access privilege for the electronic resource for the user based on the electronic submission indication, the second pose, and the test condition.

Still another embodiment of the present disclosure includes a processor and a memory storing a program which, when executed on the processor, performs an operation for determining whether an entity seeking access to an electronic resource is human. The operation generally includes receiving an electronic request from a user to access an electronic resource; identifying, in response to the electronic request, a test for the user to complete in order to gain access to the electronic resource, wherein the test is associated with a digital model of a three-dimensional (3D) environment and a test condition; rendering, on a digital display and based on the digital model, a first view of the 3D environment from a first viewing perspective; sending, in response to the electronic request, a message indicating the test condition to the user; receiving electronic input from the user in response to the message; rendering, on the digital display and based on the digital model, a second view of the 3D environment from a second viewing perspective, wherein the second viewing perspective is based on the electronic input; receiving an electronic submission indication from the user for the test; and determining an access privilege for the electronic resource for the user based on the electronic submission indication, the second viewing perspective, and the test condition.

DETAILED DESCRIPTION

Figure 1:
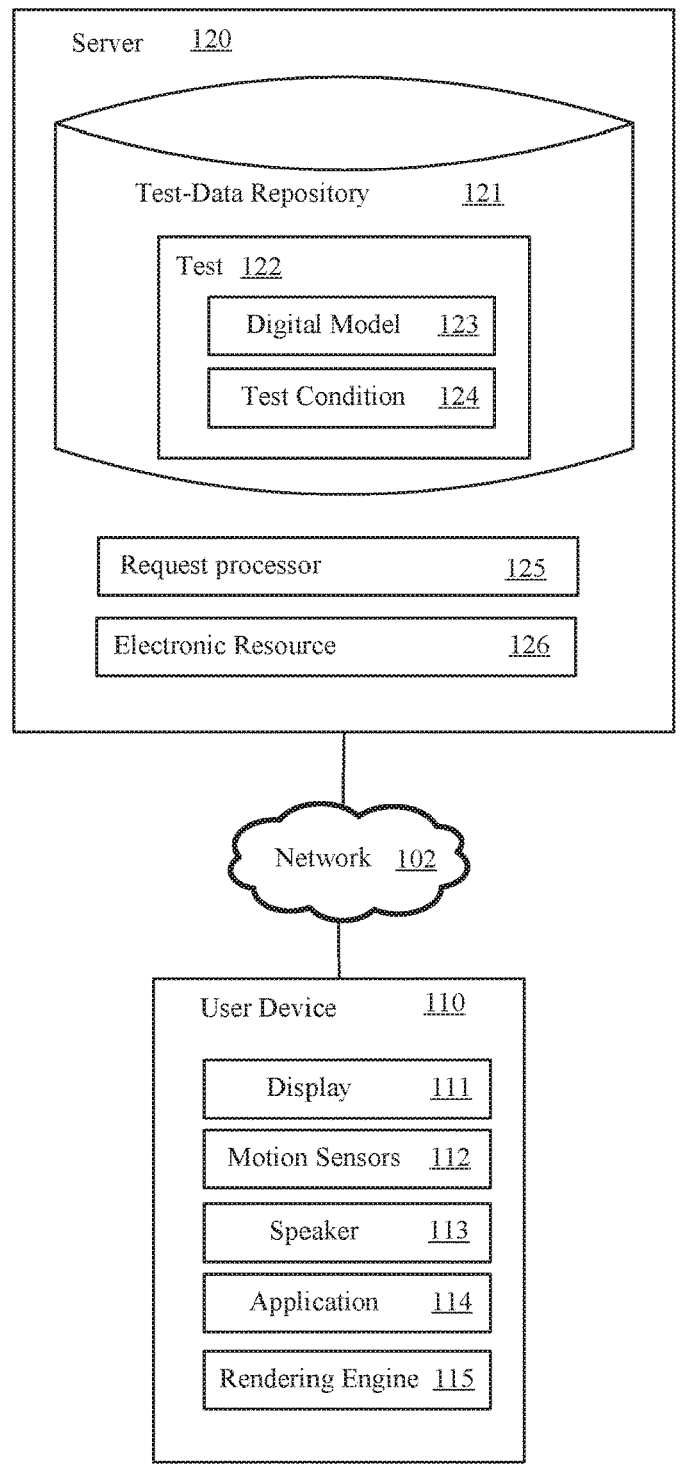
FIG. 1 illustrates a computing network environment wherein technology of the present disclosure can operate, according to one embodiment.

While existing CAPTCHAs can prevent some types of bots from accessing electronic resources, more advanced bots that can defeat traditional CAPTCHAs now exist. In particular, as processing power and speed has increased, some types of CAPTCHAs (e.g., those with images of plain text) have become easier to defeat. Therefore, more complex challenge-response tests are needed to protect electronic resources from abuse and attacks from bots.

Embodiments presented herein provide an automated, interactive, electronic challenge-response system that can distinguish more advanced bots from human users. In systems of the present disclosure, a challenge-response test is associated with a digital model of a three-dimensional (3D) environment. In a simple example, the digital model can be a panoramic image. In another example, the digital model can be a more complicated representation of a 3D environment, such as a stereolithography (STL) file, an object (OBJ) file, or a set of files (e.g., where geometry, texture, lighting, and other details are stored in separate associated files). The digital model can also include elements that can move, bend, stretch, or change in other ways over time within the 3D environment. The digital model may also be associated with one or more audio files for producing sound effects associated with the 3D environment.

A challenge-response test can be triggered when a user operating a user device attempts to access an electronic resource (e.g., an application, an online service, a database, etc.). To begin the test, a first view of the 3D environment from a first viewing perspective is rendered on a display.

There are many different types of user devices that may be used, such as smartphones, virtual-reality headsets, laptop computers, desktop computers, gaming consoles, and any other device that can render images on a display. There are many different types of displays that may be used. Some non-limiting examples may include liquid crystal displays (LCD), organic light-emitting diode (OLED) displays, active matrix organic light-emitting diode (AMOLED) displays, gas plasma-based flat panel displays, projector displays, transparency viewer displays, and head-mounted displays (e.g., virtual reality glasses or headsets). In some embodiments, displays may have additional functionality that enables using stereoscopic, holographic, anaglyphic, and other techniques to achieve a more thoroughly three-dimensional appearance. The view can also be rendered as an autostereogram. An autostereogram is a single-image stereogram (SIS) that creates an illusion of depth in 3D scene from a two-dimensional image. Humans with two functioning eyes can perceive the illusion by looking "through" the image (e.g., by adjusting the convergence angle between the eyes). However, bots may be confused by a view that is rendered as an autostereogram.

The first viewing perspective may be defined by a virtual camera in an initial pose (i.e., position and orientation). In computer graphics and animation, a virtual camera refers to a function of the rendering engine that determines what would be seen through a camera disposed at a specific position and in a specific orientation (e.g., pointing in a specific direction) within a 3D environment. The position and orientation can be referred to collectively as the pose of the virtual camera. The pose of the virtual camera can be defined by one or more parameters, such as x, y, and z coordinates for position and pitch θ, roll Ø, and yaw ψ parameters defining rotation angles about y-axis, the x-axis, and the z-axis, respectively, in a rectangular coordinate system. The parameters may also be defined using other types of coordinates, such as spherical coordinates or cylindrical coordinates.

Once the first view is visible on the display, the user can proceed to take the challenge-response test by providing input to signal how the first view should be adjusted to meet one or more test conditions. There are many types of test conditions that can be used. In one example, a test condition can specify that the view should be adjusted until a preselected element within the 3D environment is visible. Another condition may be that a particular side of the preselected element be visible or that the element be visible through a focus area on the display. In another example, the condition may be that the first view be adjusted until the preselected element is visible through apertures in one or more elements (e.g., until a bullseye is visible through apertures in twelve axes, as a tribute Homer's Odyssey). In another example, a test condition may involve achieving a series of views over a predetermined period of time (e.g., by tracking an object moving through the 3D environment so that the object remains visible on the display for the predetermined time period).

The user device can inform the user of the test conditions via instructions shown on the display as text or announced through speakers associated with the user device. For example, if the test condition is that the view should be adjusted until a bat in the 3D environment is visible through a focus area, the instructions can directly state "adjust the view until the bat is in the focus area." Alternatively, the instructions can refrain from stating the name of the preselected element (the term "bat," in this example) so that bots will be less likely to interpret the instructions successfully.

Instead, circumlocutory instructions that do not directly state the name of the preselected element can be used, such as "adjust the view until the mammal that sleeps upside down is in the focus area" or "adjust the view until the living thing that uses bio sonar to locate objects is in the focus area." A human user is more likely to understand such circumlocutory instructions than a bot.

To signal how to adjust the view rendered on the display, the user can provide electronic input in a number ways. For example, if the user device is a smartphone or a tablet computer, the user input can maneuver the user device to signal how the user wishes to adjust the view rendered on the display. Motion-detecting devices within the user device, such as a gyro sensor, an accelerometer, or a global positioning system (GPS) can detect and quantify changes to the position and orientation of the user device that result from the maneuvering. Also, if the digital display is a touch screen, the user may provide input through the touch screen (e.g., by touching the screen with two fingers and moving the fingers farther apart to zoom). In other embodiments, the user input may be received through some other type of I/O peripheral, such as computer mouse, a control pad, a trackpad, a keyboard, or a microphone.

Upon receiving the input from the user, the user device determines an updated viewing perspective. For example, suppose the user device is a smartphone or a tablet computer. If the user increases the yaw of the user device by 20 degrees, the user device can increase the yaw of the virtual camera within the 3D environment by 20 degrees. If the user moves the user device six inches to the left, the user device can move the position of the virtual camera within the 3D environment six inches to the left (or a distance to the left that is proportional to six inches, depending on the intended scale of the 3D environment).

Depending on the embodiment, it is also possible to use a less literal scheme to convert the maneuvering of the user device to changes in the pose of the virtual camera. For example, each rotation (i.e., change in orientation) or translation (i.e., change in position) may be multiplied by a respective coefficient before being applied to the virtual camera. If the coefficient for rotations is two, for example, rotating the user device ten degrees would result in a twenty-degree rotation of the virtual camera within the 3D environment. Optionally, a slider or some other tool shown on the display can give the user an option to adjust the coefficients. By adjusting the coefficients, the user can control the sensitivity of the user device. For example, suppose a preselected object the user wishes to view is initially behind the virtual camera in the 3D environment. If the user wants to rotate the virtual camera 180 degrees quickly without having to turn completely around, the user can set the rotation coefficient to ten and rotate the user device 18 degrees to that the preselected object comes into view on the display. Next, if the user can set the rotation coefficient to a smaller number (even a number less than one, if desired) so that the user can carefully maneuver the user device so that the preselected object becomes visible in a small focus area.

The user continues to provide input to adjust the viewing perspective and the user device continues to render updated views of the 3D environment on the display based on the input until the user provides a submission indication for the test (e.g., by clicking on a button labeled "submit"). Upon receiving the submission indication, the user device determines whether the one or more test conditions have been satisfied. If so, the user device allows the user to access the electronic resource. If not, the user device prevents the user from accessing the electronic resource. For example, if the test condition is that a preselected element of the 3D environment be visible in a focus area on the display, the user device will consider the test condition satisfied if the preselected element was visible in the focus area at the time the submission indication was received from the user.

In some cases, the user device can also allow the user to select an assistance option (e.g., for users that are visually impaired). If the user selects the assistance option, the user device provides audible instructions through an electronic speaker. The audible instructions tell the user how to generate the electronic input to satisfy the test condition. For example, if the test condition is that a preselected element of the 3D environment be visible in a focus area on the display, the audible instructions can tell the user to rotate the user device in a particular direction by a certain number of degrees.

FIG. 1 illustrates a computing network environment 100 wherein technology of the present disclosure can operate, according to one embodiment. As shown, the environment 100 includes a user device 110 connected to a server 120 via a network 102. The server 120 includes a test-data repository 121, a request processor 125, and an electronic resource 126 (e.g., an online service, a data repository, etc.). The test-data repository 121 includes at least one test, such as test 122. As shown, test 122 is defined, at least in part, by a digital model 123 and a test condition 124. The digital model 123 represents a virtual three-dimensional (3D) environment. The test condition 124 may represent a single condition or a set of multiple conditions to be satisfied in order to pass the test. While FIG. 1 shows the test data repository 124 as being located on the server 120, some or all tests (e.g., test 122) may also be stored locally on the user device 110 (e.g., in memory or storage) in other embodiments.

When a user attempts to access the application 114 on the user device 110 (or the electronic resource 126, in some embodiments), the server 120 sends the test 122 to the user device 110. The rendering engine 115 renders a first view of the 3D environment from a first viewing perspective on the display 111. The first view may be a rendering of the 3D environment as seen from a first viewing perspective.

Via the display 111 or via the speaker 113, the user device 110 informs the user of the test condition 124. In this example, the user device 110 instructs the user adjust the viewing perspective of the 3D environment by maneuvering the user device 110 until a preselected element in the 3D environment is visible in a focus area shown on the display 111.

In response, the user maneuvers the user device 110 to attain a second view of the environment. The motion sensors 112 (e.g., a gyro sensor and an accelerometer) detect and quantify changes to the position and orientation of the user device 110 that result from the maneuvering.

The rendering engine 115 receives electronic input from the user via the motion sensors 112. Based on this electronic input, the rendering engine 115 renders a second view of the 3D environment from a second viewing perspective on the display 111. For example, if the user adjusts the pitch of the user device 110 by thirty degrees, the rendering engine 115 can adjust the pose of a virtual camera by thirty degrees and render the second view on the display 111 based on the adjusted pose.

If the user believes the test condition 124 has been satisfied (e.g., because the preselected element in the 3D environment is visible in the focus area in the second view), the user provides an electronic submission indication to indicate that the user has completed the test 122 (e.g., by tapping a "submit" button on the display 111).

Upon receiving the electronic submission indication from the user, the user device 110 verifies whether the test condition 124 has been satisfied. If so, the user device 110 allows the user to access the application 114 (or the electronic resource 126, depending on the embodiment). However, if the test condition has not been satisfied, the user device 110 prevents the user from accessing the application 114 (or the electronic resource 126).

Figure 2:
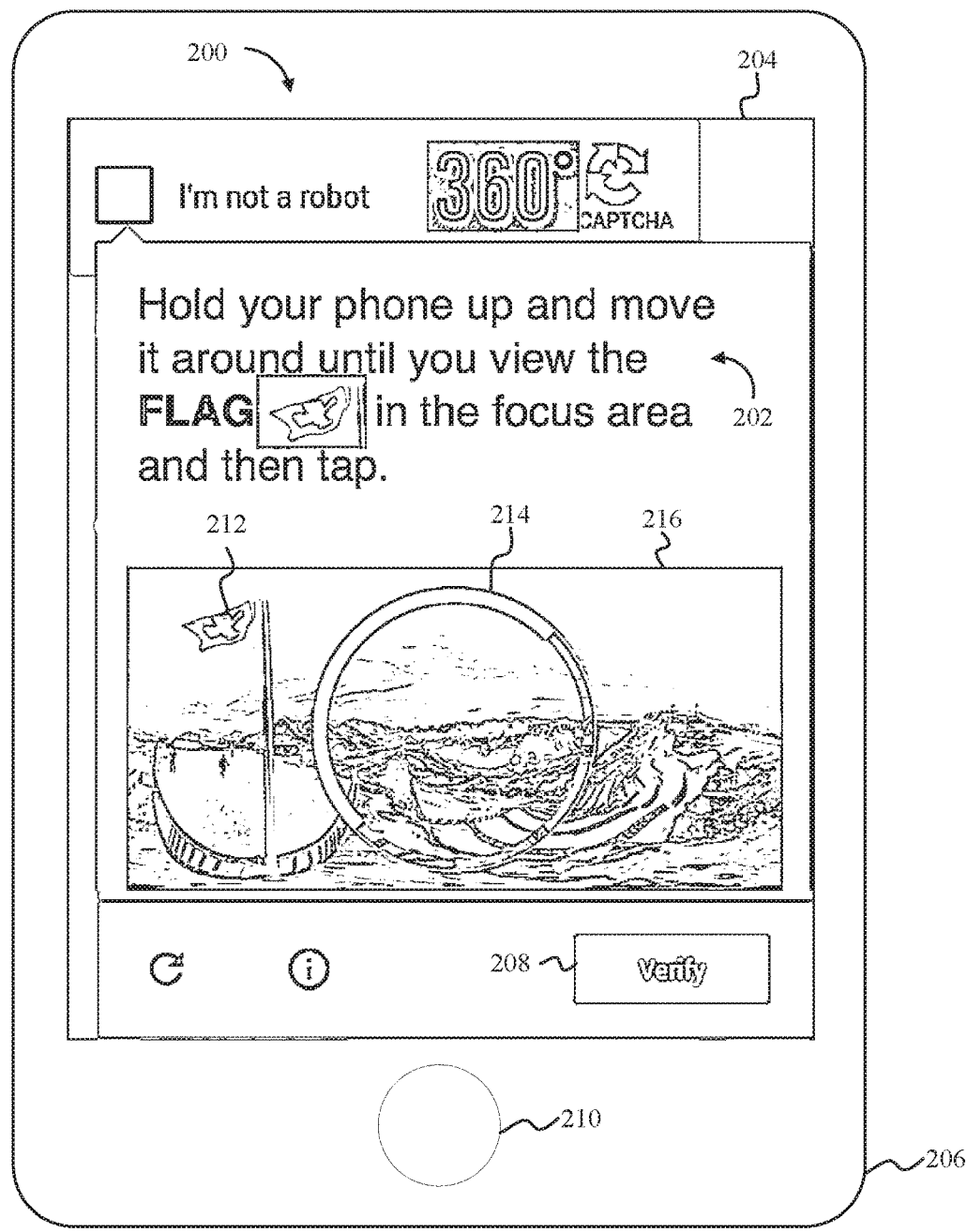
FIG. 2 is an example screenshot illustrating how a test to determine whether a user is human may be presented on a display of a user device 206, according to one embodiment.

FIG. 2 is an example screenshot 200 illustrating how a test to determine whether a user is human may be presented on a display of a user device 206, according to one embodiment. A view of a panoramic image of ski slope is shown in the rendering area 216. As shown, instructions 202 may be shown on display 204 of a user device direct the user to move the user device 206 until the flag 212 shown in the rendering area 216 is visible in the focus area 214.

In response, the user maneuvers the user device 206. In response to the maneuvering, the user device 206 calculates an adjusted viewing perspective for the panoramic image based on the maneuvering and renders an updated view of the panoramic image in the rendering area 216. If the user observes that the flag 212 is visible in the focus area 214 in the updated view, the user taps on the button 208 to indicate that the test condition specified in the instructions 202 (i.e., that the flag 212 be visible in the focus area 214) is satisfied.

Once the user taps on the button 208 (or, in an alternative embodiment, button 210), the user device 206 verifies whether the flag 212 is visible in the focus area 214. For example, in one embodiment, a viewing perspective is defined by one or more parameters. For example, a viewing perspective shown in the rendering area may be associated with one or more parameters indicating a position (e.g., x, y, and z coordinates for a rectangular coordinate systems) and/or orientation (e.g., pitch θ, roll Ø, and yaw ψ defining rotation angles about y, x, and z axes, respectively, in rectangular coordinate systems) of a virtual camera on which the viewing perspective is based. As the user maneuvers the user device 206, changes in the position or orientation of the user device 206 are reflected by corresponding changes to the position or orientation of the virtual camera. Changes to the position or orientation of the virtual camera are reflected, in turn, by changes to the one or more parameters and to the view rendered in the rendering area 216. The test may include a set of acceptable parameter ranges that specify when the test condition is satisfied. In this case, the set of acceptable parameter ranges would indicate the poses of the virtual camera for which the flag 212 would be rendered inside the focus area 214. If the parameters indicating the position or orientation of the virtual camera fall within the set of acceptable parameter ranges when the button 208 is tapped, the user device 206 considers the test condition to be satisfied.

In another embodiment, metadata associated with the panoramic image identifies a set of pixels that represent the flag 212 and a set of pixels that represent the focus area 214. The metadata can be updated when an updated view of the panoramic image is generated. The user device 206 determines whether some or all of the pixels representing the flag 212 also represent the interior of the focus area 214. Optionally, graphical collision-detection techniques can be used to make the determination.

Once the user device 206 has verified that the test condition has been satisfied, the user device 206 allows the user to access an electronic resource. (Typically, the test was triggered by a request from the user to access the electronic resource.)

Figure 3:
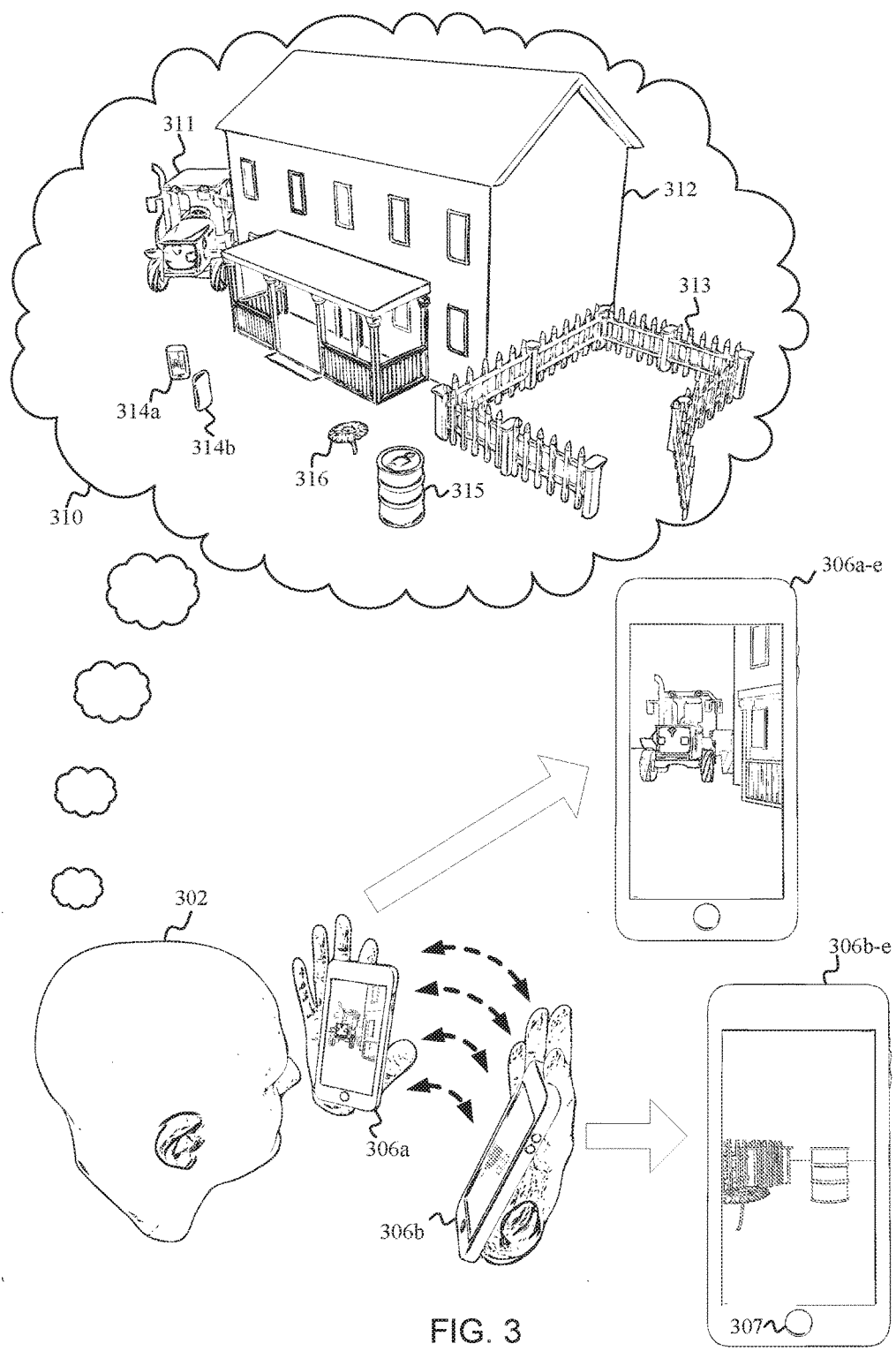
FIG. 3 illustrates a first example of how a challenge-response test to determine if a user is human can operate, according to one embodiment.

FIG. 3 illustrates a first example of how a challenge-response test to determine if a user is human can operate, according to one embodiment. The user device 306a and the user device 306b are meant to represent the same user device in a first pose and a second pose, respectively. User device 306a-e is an enlarged view of the user device 306a and is provided to more clearly illustrate what is shown on the display of the user device 306a in the first pose. Similarly, user device 306b-e is an enlarged view of the user device 306b and is provided to more clearly illustrate what is shown on the display of the user device 306b in the second pose. User device 314a is a placeholder that is meant to illustrate the corresponding pose of a virtual camera within a 3D environment 310 when the user device 306a is in the first pose. Similarly, user device 314b is a placeholder that is meant to illustrate the corresponding pose of the virtual camera within the 3D environment 310 when the user device 306b is in the second pose.

When a user 302 submits an electronic request to access an electronic resource (e.g., by tapping an icon for the electronic resource on the touch screen of the user device 306a), the user device 306a identifies a challenge-response test for the user to complete in order to gain access to the electronic resource. A digital model of the 3D environment 310 serves as a framework for the test. The user device 306a renders a first view of the 3D environment 310 from a first viewing perspective. User device 314a marks the corresponding pose of a virtual camera within the 3D environment 310 for the first viewing perspective. As shown by the enlarged user device 306a-e, the user can see the tractor 311 and a part of the house 312 in the first view.

The user device 306a sends a message to the user (e.g., visually via the touch screen or audibly via a speaker) explaining a test condition to the user. In this example, the test condition is that the user maneuver the user device 306a until the barrel 315 becomes visible onscreen.

In response, the user moves the user device 306a to the right into the second pose shown by user device 306b. The user device 306b renders a second view of the 3D environment 310 from a second viewing perspective. User device 314b marks the corresponding pose of a virtual camera within the 3D environment 310 for the second viewing perspective. As shown by the enlarged user device 306b-e, the user can see the barrel 315, the flower 316, and part of the fence 313 in the second view.

Upon seeing that the barrel 315 is visible in the second view, as shown by the enlarged user device 306b-e, the user provides an electronic submission indication for the test (e.g., by tapping on the display or on the button 307). Upon receiving the electronic submission indication, the user device 306b determines an access privilege for the electronic resource for the user based on the electronic submission indication, the second viewing perspective, and the test condition. More specifically, in this example, the user device 306b verifies that the barrel 315 is visible on the display of the user device 306b and allows the user to access the electronic resource.

Figure 4:
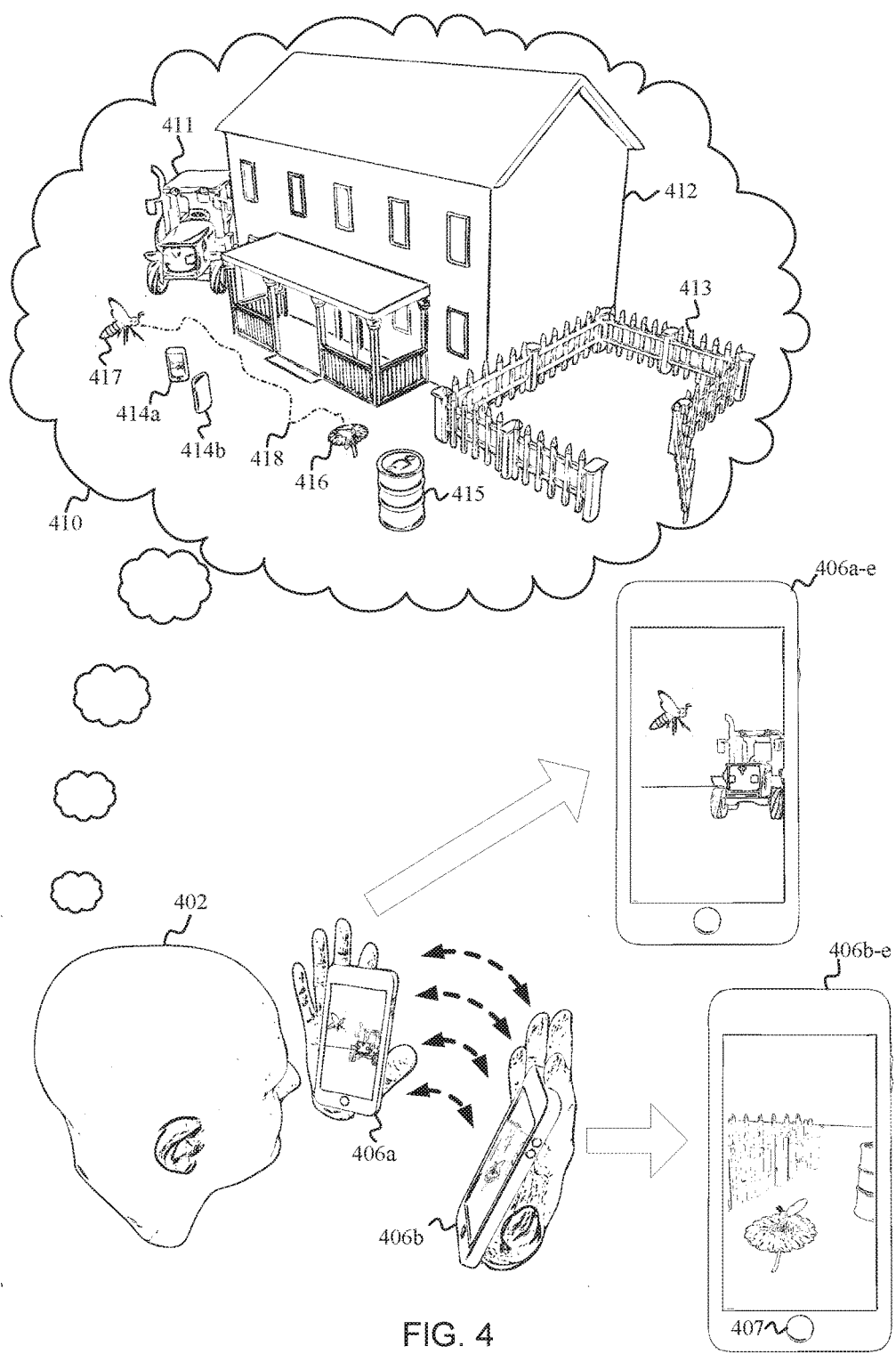
FIG. 4 illustrates a second example of how a challenge-response test to determine if a user is human can operate, according to one embodiment.

FIG. 4 illustrates a second example of a challenge-response test to determine if a user is human, according to one embodiment. The user device 406a and the user device 406b are meant to represent the same user device in a first pose and a second pose, respectively. User device 406a-e is an enlarged view of the user device 406a and is provided to more clearly illustrate what is shown on the display of the user device 406a in the first pose. Similarly, user device 406b-e is an enlarged view of the user device 406b and is provided to more clearly illustrate what is shown on the display of the user device 406b in the second pose. User device 414a is a placeholder that is meant to illustrate the corresponding pose of a virtual camera within a 3D environment 410 when the user device 406a is in the first pose. Similarly, user device 414b is a placeholder that is meant to illustrate the corresponding pose of the virtual camera within the 3D environment 410 when the user device 406b is in the second pose.

When a user 402 submits an electronic request to access an electronic resource (e.g., by tapping an icon for the electronic resource on the touch screen of the user device 406a), the user device 406a identifies a challenge-response test for the user to complete in order to gain access to the electronic resource. A digital model of the 3D environment 410 serves as a framework for the test. The user device 406a renders a first view of the 3D environment 410 from a first viewing perspective. User device 414a marks the corresponding pose of a virtual camera within the 3D environment 410 for the first viewing perspective. As shown by the enlarged user device 406a-e, the user can see the bee 417 and the tractor 411 in the first view. In the example of FIG. 4, the bee 417 is dynamic in the sense that the bee 417 can move to different locations in the 3D environment 410 over time.

The user device 406a sends a message to the user (e.g., visually via the touch screen or audibly via a speaker) explaining a test condition to the user. In this example, the test condition is that the user maneuver the user device 306a so that the bee 417 stays in view for a predefined period of time while the bee 417 moves along the path 418 in front of the house 412 and lands on the flower 416. The user device 406a can, in some embodiments, have a timer (e.g., visible onscreen or audible via speakers) to apprise the user of how much time has elapsed since the user commenced taking the challenge-response test.

In response, while the bee 417 flies along the path 418, the user moves the user device 306a to the right at a rate that keeps the bee 417 in view. While the user is moving the user device 306a, the user device 306a renders updated views of the 3D environment 410 continuously throughout the motion until reaching the position of user device 406b.

For each view rendered, the user device 306a keeps track of whether the bee 417 is visible. This can be accomplished in several different ways. For example, the test condition can include sets of acceptable parameter ranges that indicate which poses of a virtual camera would cause the bee 417 to be rendered onscreen at each time during the predefined time period. If the virtual camera (e.g., as marked by user devices 414a and 414b) is in a pose satisfying the predefined parameter ranges for the entire predefined time period, the test condition may be considered satisfied. In another example, for each rendered view of the 3D environment 410, metadata can associate pixels with elements the pixels are meant to represent. The metadata can be updated when an updated view of the panoramic image is generated. If at least some pixels representing the bee 417 are present onscreen for each view rendered during the predefined time period, the test condition may be considered satisfied.

When the bee 417 lands on the flower 416 at the end of the predefined time period, the bee 417, the fence 413, the barrel 415, and the flower 416 are visible onscreen, as seen on the enlarged user device 406b-e. User device 414b marks the corresponding pose of a virtual camera within the 3D environment 410 for the viewing perspective seen on the enlarged user device 406b-e.

The user, detecting that the predefined time period has elapsed (e.g., via an indication from the timer), provides an electronic submission indication for the test (e.g., by tapping on the display or on the button 407). Upon receiving the electronic submission indication, the user device 406b determines an access privilege for the electronic resource for the user. More specifically, in this example, if the bee 417 was visible onscreen for the predefined time period, the user device 406b allows the user to access the electronic resource.

Figure 5:
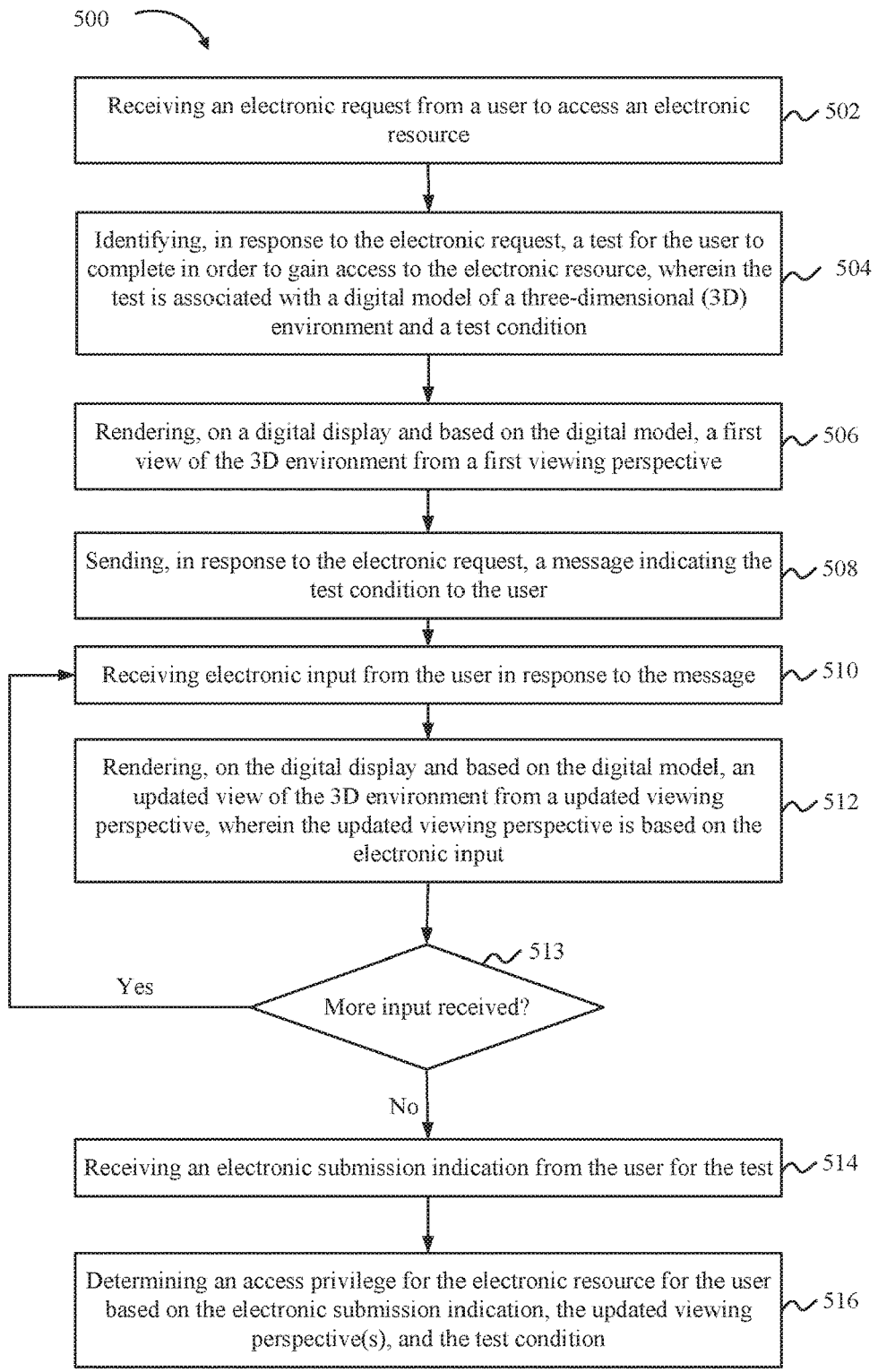
FIG. 5 illustrates operations for determining whether a user attempting to access an electronic resource is human, according to one embodiment.

FIG. 5 illustrates example operations 500 for determining whether a user attempting to access an electronic resource is human, according to one embodiment. The operations 500 can be implemented as a method or the operations 500 can be executed as instructions on a machine (e.g., by one or more processors), where the instructions are included on at least one non-transitory computer-readable storage medium.

As in block 502, the operations 500 include receiving an electronic request from a user to access an electronic resource. The request may be received via an input/output (I/O) device that is part of a user device. For example, the user may touch an icon associated with the electronic resource on a touch screen or speak the name of the electronic resource into a microphone. In another example, the user may use a computer mouse, a control pad, a keyboard, or some other type of peripheral to indicate that the user wants to access the electronic resource. The electronic resource may be an application, a file, or some other type of resource.

As in block 504, the operations 500 include identifying, in response to the electronic request, a test for the user to complete in order to gain access to the electronic resource. The test is associated with a digital model of a 3D environment and with at least one test condition. The level of detail with which a digital model represents the 3D environment can vary. For example, the digital model can be a panoramic image. In another example, the digital model can be a more complicated representation of a 3D environment, such as a stereolithography (STL) file, an object (OBJ) file, or a set of files (e.g., wherein geometry, texture, lighting, and other details are stored in separate associated files). The digital model can also include elements that can move, bend, stretch, or change in other ways over time within the 3D environment (e.g., like the bee described in FIG. 4). The digital model may also be associated with one or more audio files for producing sound effects associated with the 3D environment.

As in block 506, the operations 500 include rendering a first view of the 3D environment on a digital display from a first viewing perspective based on the digital model. In one example, the first viewing perspective may be defined based on a position and orientation for a virtual camera associated with the 3D environment. In computer animation, the term "virtual camera" refers to a function that determines how to render a view of a 3D environment from a specified position and orientation within the 3D environment. In computer vision, a combination of a position and an orientation can be referred to as a "pose." Optionally, a virtual camera may also have a configuration that takes other parameters that affect how a view is rendered into account. For example, a virtual camera may take focal length, aperture, and sensitivity (e.g., ISO) into account. Thus, both the pose and the configuration of the virtual camera may define a viewing perspective.

As in block 508, the operations 500 include sending, in response to the electronic request, a message notifying the user of the test condition. The message informs the user how to satisfy the test condition. For example, the message may indicate that the test condition will be satisfied when a specified element is visible in a focus area shown on the digital display or after a moving element in the 3D environment has been visible on the digital display for a predefined period of time.

Optionally, the operations 500 also include receiving an electronic indication that the user is visually impaired and outputting audio instructions to the user via one or more speakers. The audio instructions advise the user of how to meet the test condition. For example, if the user is taking the test on a mobile device and the adjusting the pitch of the mobile device by 30 degrees will satisfy the test condition, the audio instructions can state "tilt the top of your mobile device thirty degrees toward you" or something similar.

As in block 510, the operations 500 include receiving electronic input from the user in response to the message. In examples where a virtual camera is used, the electronic input indicates how the user wishes to adjust the first viewing perspective in order to satisfy the test condition. For example, the user input may indicate how to adjust the pose or configuration of a virtual camera within the 3D environment. In one embodiment, the user input is received via motion-detecting devices of a mobile device that includes the digital display. For example, changes in the orientation of the mobile device may be detected by a gyroscope or gyro sensor, while changes in the position of the mobile device may be detected by an accelerometer or a global positioning system (GPS). Also, if the digital display is a touch screen, the user may provide input through the touch screen (e.g., by touching the screen with two fingers and moving the fingers farther apart to zoom). In other embodiments, the user input may be received through some other type of I/O peripheral, such as computer mouse, a control pad, a trackpad, a keyboard, or a microphone.

As in block 512, the operations 500 include rendering an updated view of the 3D environment on the digital display from an updated viewing perspective based on the digital model. The updated viewing perspective is based on the electronic input received from the user. For example, if the digital display is part of a mobile device and the user input adjusts the yaw of the mobile device by 57 degrees (i.e., about one radian), the yaw for a virtual camera for the 3D environment can be adjusted by 57 degrees from a first pose into a updated pose. The first pose corresponds to the first viewing perspective, while the updated pose corresponds to the updated viewing perspective. Hence, the updated view reflects changes to the viewing perspective that the user signaled via the electronic input.

As in block 513, the operations 500 include monitoring whether additional input is received (e.g., through motion-detecting sensors or some other I/O device). If so, the flow of operations 500 returns to block 512 so another updated view can be rendered based on the additional input. Otherwise, the flow of operations 500 proceeds to block 514.

As in block 514, the operations 500 include receiving an electronic submission indication for the test from the user. The electronic submission indication signals that the user believes the test condition has been satisfied. For example, if the test condition is that a specified element be visible in a focus area of the digital display, the user may tap a "submit" button upon observing that the updated view shows the specified element inside the focus area. Alternatively, the user can utter a keyword or phrase (e.g., "submit test") into a microphone to provide the electronic submission indication.

As in block 516, the operations 500 include determining an access privilege for the electronic resource for the user based on the electronic submission indication, the updated viewing perspective, and the test condition. Specifically, if the test condition has been satisfied, the user is allowed to access the electronic resource. Conversely, if the test condition has not been satisfied, the user is prevented from accessing the electronic resource.

Figure 6:
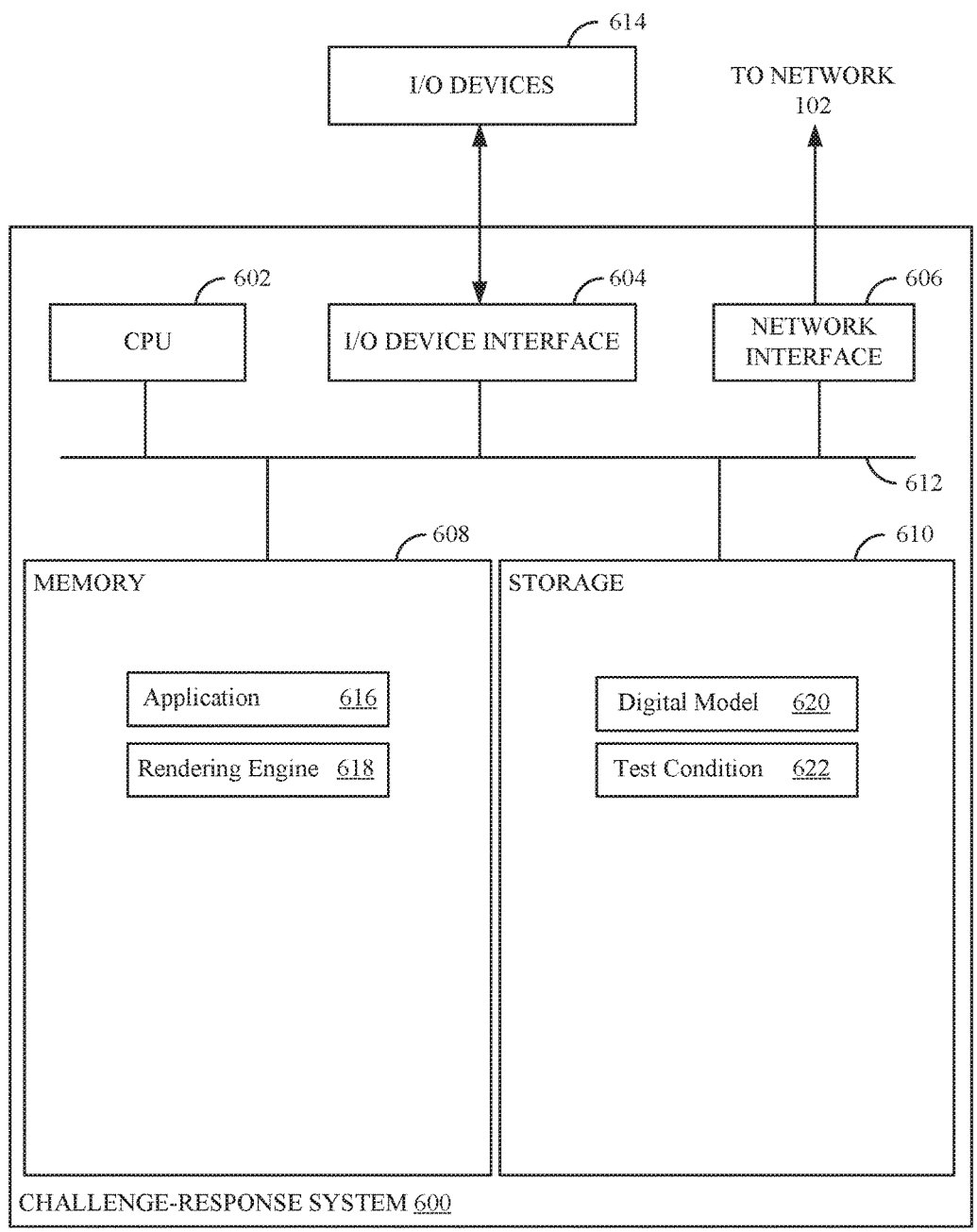
FIG. 6 illustrates a challenge-response system that determines whether a user attempting to access an electronic resource is human, according to an embodiment.

FIG. 6 illustrates a challenge-response system 600 that determines whether a user attempting to access an electronic resource is human, according to an embodiment. As shown, the challenge-response system 600 includes, without limitation, a central processing unit (CPU) 602, at least one I/O device interface 604 which may allow for the connection of various I/O devices 614 (e.g., keyboards, displays, mouse devices, pen input, speakers, microphones, motion sensors, etc.) to the challenge-response system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 can represent a single CPU, multiple CPUs, a single CPU having multiple processing cores, and the like. Additionally, the memory 608 represents random access memory. Furthermore, the storage 610 may be a disk drive. Although shown as a single unit, the storage 610 may be a combination of fixed or removable storage devices, such as fixed disc drives, removable memory cards or optical storage, network attached storage (NAS), or a storage area-network (SAN).

As shown, memory 608 includes application 616 and rendering engine 618. As shown, storage 610 includes digital model 620 and test condition 622. When a user attempts to access the application 616, the rendering engine 618 renders a first view of a 3D environment represented by the digital model 620 on a display within the I/O devices 614. The challenge-response system 600 informs the user of the test condition 622 via the I/O devices 614. In response, the user provides electronic input via the I/O devices 614. Based on the user input, the rendering engine 618 renders a second view of the 3D environment represented by the digital model 620.

Upon seeing the second rendered view on the display, the user provides an electronic submission indication via the I/O devices 614. If the test condition 622 is satisfied by the second view, the challenge-response system 600 allows the user to access the application 616. Otherwise, the challenge-response system 600 prevents the user from accessing the application 616.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for determining whether a user seeking access to an electronic resource is human, the method comprising:
   receiving a request from a user to access an electronic resource;
   determining, based on the request, a test for the user to complete, wherein the test comprises:
      a digital model of a three-dimensional (3D) environment; and
      a test condition;
   rendering, on a digital display and based on the digital model:
      a first view of the 3D environment; and
      a display sensitivity adjustment tool;
   indicating the test condition to the user;
   receiving, via the display sensitivity adjustment tool, a request from the user to adjust a coefficient associated with a sensitivity of a user input, wherein the user input comprises at least one of:
      a rotation of the 3D environment;
      a translation of the 3D environment; or
      a focus adjustment of the 3D environment;
   adjusting, based on the request, the coefficient associated with the sensitivity of the user input;
   receiving the user input in response to the test condition;
   rendering, on the digital display, a second view of the 3D environment, wherein the rendered second view of the 3D environment is based on the user input;
   receiving a submission indication from the user;
   based on the submission indication, the test condition, and the second view of the 3D environment determining:
      the test condition is satisfied; and
      the user is human; and
   enabling access of the electronic resource to the user.

2. The method of claim 1, further comprising:
   based on the submission indication, the test condition, and the second view of the 3D environment, determining:
      the test condition is not satisfied; and
      the user is not human.

3. The method of claim 2, further comprising:
   preventing the user from accessing the electronic resource.

4. The method of claim 1, wherein the test condition is that a preselected element in the 3D environment be visible in a focus area of the digital display.

5. The method of claim 1, wherein receiving the submission indication is based on a predefined time period elapsing.

6. The method of claim 1, wherein indicating the test condition to the user comprises at least one of:
   a visual instruction for the user; or
   an audio instruction for the user.

7. The method of claim 1, further comprising: receiving the user input from the user via one or more motion-detecting devices.

8. A system comprising:
   one or more processors; and
   memory storing one or more instructions that, when executed on the one or more processors, perform an operation for determining whether a user seeking access to an electronic resource is human, the operation comprising:
      receiving a request from a user to access an electronic resource;
      determining, based on the request, a test for the user to complete, wherein the test comprises:
         a digital model of a three-dimensional (3D) environment; and
         a test condition;
      rendering, on a digital display and based on the digital model:
         a first view of the 3D environment; and
         a display sensitivity adjustment tool;
      indicating the test condition to the user;
      receiving, via the display sensitivity adjustment tool, a request from the user to adjust a coefficient associated with a sensitivity of a user input, wherein the user input comprises at least one of:
         a rotation of the 3D environment;
         a transition of the 3D environment; or
         a focus adjustment of the 3D environment;
      adjusting, based on the request, the coefficient associated with the sensitivity of the user input;
      receiving the user input in response to the test condition;
      rendering, on the digital display, a second view of the 3D environment, wherein the rendered second view of the 3D environment is based on the user input;
      receiving a submission indication from the user;
      based on the submission indication, the test condition, and the second view of the 3D environment, determining:
         the test condition is satisfied; and
         the user is human; and
      enabling access of the electronic resource to the user.

9. The system of claim 8, wherein the operation further comprises:
   based on the submission indication, the test condition, and the second view of the 3D environment, determining:
      the test condition is not satisfied; and
      the user is not human.

10. The system of claim 9, wherein the operation further comprises:
    preventing the user from accessing the electronic resource.

11. The system of claim 8, wherein the test condition is that a preselected element in the 3D environment be visible in a focus area of the digital display.

12. The system of claim 8, wherein the operation further comprises receiving the submission indication is based on a predefined time period elapsing.

13. The system of claim 8, wherein the operation further comprises indicating the test condition to the user comprises at least one of:
    a visual instruction for the user; and
    an audio instruction for the user.

14. The system of claim 8, wherein the operation further comprises receiving the user input from the user via one or more motion-detecting devices.

15. A non-transitory computer-readable storage medium containing instructions that, when executed by one or more processors, perform an operation for determining whether a user seeking access to an electronic resource is human, the operation comprising:
  receiving a request from a user to access an electronic resource;
  determining, based on the request, a test for the user to complete, wherein the test comprises:
    a digital model of a three-dimensional (3D) environment; and
    a test condition;
  rendering, on a digital display and based on the digital model;
    a first view of the 3D environment; and
    a display sensitivity tool:
  indicating the test condition to the user;
  receiving, via the display sensitivity adjustment tool, a request from the user to adjust a coefficient associated with a sensitivity of a user input, wherein the user input comprises at least on of:
    a rotation of the 3D environment;
    a translation of the 3D environment; or
    a focus adjustment of the 3D environment;
  adjusting, based on the request, the coefficient associated with the sensitivity of the user input;
  receiving the user input in response to the test condition;
  rendering, on the digital display, a second view of the 3D environment, wherein the rendered second view of the 3D environment is based on the user input;
  receiving a submission indication from the user;
  based on the submission indication, the test condition, and the second view of the 3D environment, determining:
    the test condition is satisfied; and
    the user is human; and
  enabling access of the electronic resource to the user.

16. The non-transitory computer-readable storage medium of claim 15, wherein the operation further comprises:
  based on the submission indication, the test condition, and the second view of the 3D environment, determining:
    the test condition is not satisfied; and
    the user is not human; and
  preventing the user from accessing the electronic resource.

17. The non-transitory computer-readable storage medium of claim 15, wherein the test condition is that a preselected element in the 3D environment be visible in a focus area of the digital display.

18. The non-transitory computer-readable storage medium of claim 15, wherein the operation further comprises receiving the submission indication is based on a predefined time period elapsing.

19. The non-transitory computer-readable storage medium of claim 15, wherein the operation further comprises indicating the test condition to the user comprises at least one of:
  a visual instruction for the user; or
  an audio instruction for the user.

20. The non-transitory computer-readable storage medium of claim 15, wherein the operation further comprises receiving the user input from the user via one or more motion-detecting devices.

* * * * *